United States Patent
Dölz

(10) Patent No.: US 8,946,969 B2
(45) Date of Patent: Feb. 3, 2015

(54) ROTOR OF AN ASYNCHRONOUS MACHINE WITH RETAINING ELEMENT

(71) Applicant: Volker Dölz, Bad Neustadt (DE)

(72) Inventor: Volker Dölz, Bad Neustadt (DE)

(73) Assignee: Siemens Aktiengesellschaft, München (DE)

( * ) Notice: Subject to any disclaimer, the term of this patent is extended or adjusted under 35 U.S.C. 154(b) by 73 days.

(21) Appl. No.: 13/672,199

(22) Filed: Nov. 8, 2012

(65) Prior Publication Data

US 2013/0113331 A1  May 9, 2013

(30) Foreign Application Priority Data

Nov. 9, 2011 (EP) ..................... 11188355

(51) Int. Cl.
| | |
|---|---|
| H02K 15/12 | (2006.01) |
| H02K 15/00 | (2006.01) |
| H02K 15/06 | (2006.01) |
| H02K 17/16 | (2006.01) |
| H02K 17/18 | (2006.01) |
| H02K 15/16 | (2006.01) |

(52) U.S. Cl.
CPC .............. *H02K 17/165* (2013.01); *H02K 15/06* (2013.01); *H02K 15/0012* (2013.01); *H02K 15/165* (2013.01)
USPC ........... 310/212; 310/211; 310/125; 310/124; 29/598

(58) Field of Classification Search
CPC ... H02K 17/18; H02K 17/185; H02K 17/165; H02K 15/0012
USPC ............. 310/124, 125, 211, 212; 29/596, 598
See application file for complete search history.

(56) References Cited

U.S. PATENT DOCUMENTS

| | | | |
|---|---|---|---|
| 5,990,595 A | | 11/1999 | Crowell |
| 2005/0073216 A1* | | 4/2005 | Mitcham ...................... 310/270 |
| 2009/0033170 A1* | | 2/2009 | Jakobi et al. ............. 310/156.79 |
| 2009/0066174 A1* | | 3/2009 | Watson ............................ 310/51 |
| 2011/0074240 A1 | | 3/2011 | Hiramatsu et al. |
| 2011/0241473 A1* | | 10/2011 | Hippen et al. ................. 310/211 |
| 2012/0019091 A1* | | 1/2012 | Hong et al. ................... 310/211 |
| 2012/0126657 A1* | | 5/2012 | Gerard et al. ................. 310/211 |
| 2012/0217837 A1* | | 8/2012 | Kleber .......................... 310/211 |
| 2012/0217839 A1* | | 8/2012 | Kajiya et al. .................. 310/211 |
| 2012/0286618 A1* | | 11/2012 | Alexander et al. ............. 310/211 |
| 2013/0062987 A1* | | 3/2013 | Biesenbach et al. ........... 310/211 |

FOREIGN PATENT DOCUMENTS

| | | |
|---|---|---|
| CH | 329 522 A | 4/1958 |
| DE | 27 21 211 A1 | 11/1978 |

(Continued)

*Primary Examiner* — Terrance Kenerly
(74) *Attorney, Agent, or Firm* — Henry M. Feiereisen LLC

(57) ABSTRACT

A squirrel-cage rotor of an asynchronous machine, in particular a die-cast rotor, includes a rotatable shaft, a laminated core being rotation-locked on the shaft and having grooves and opposing end faces. A squirrel-cage winding has rotor rods disposed in the grooves and a cage ring disposed on each of the end faces and electrically connecting the rotor rods. A pair of retaining elements is disposed on the shaft, wherein each retaining element extends in a radial direction in form of a disk or a spoke and has in an axial direction a wall and/or an axially extending finger. The wall overlaps on a radial periphery in the axial direction both the cage ring and a predefined axial section of the rotor rods that terminate in the cage ring, without increasing an external diameter of the laminated core.

12 Claims, 4 Drawing Sheets

(56) References Cited

FOREIGN PATENT DOCUMENTS

| | | |
|---|---|---|
| DE | 195 21 700 A1 | 12/1996 |
| DE | 197 29 432 C1 | 1/1999 |
| EP | 0 618 662 A1 | 10/1994 |
| JP | 2273059 A | 11/1990 |
| WO | WO 2005-034316 A1 | 4/2005 |
| WO | WO 2007-000413 | 1/2007 |
| WO | WO 2007-000429 A1 | 1/2007 |

* cited by examiner

ROTOR OF AN ASYNCHRONOUS MACHINE WITH RETAINING ELEMENT

CROSS-REFERENCES TO RELATED APPLICATIONS

This application claims the priority of European Patent Application, Serial No. EP 11 188 355.9 filed Nov. 9, 2011, pursuant to 35 U.S.C. 119(a)-(d), the content of which is incorporated herein by reference in its entirety as if fully set forth herein.

BACKGROUND OF THE INVENTION

The present invention relates to a squirrel-cage rotor of an asynchronous machine, in particular a die-cast rotor. The invention also relates to an asynchronous machine with a rotor of this type and a method for manufacturing a rotor of this type.

The following discussion of related art is provided to assist the reader in understanding the advantages of the invention, and is not to be construed as an admission that this related art is prior art to this invention.

Asynchronous machines normally have a cage rotor or squirrel-cage rotor. For this purpose rods are for example positioned in axially running grooves of the laminated core of the rotor. On the end faces of the laminated core the ends of the rods axially exiting the laminated core are each electrically connected to a cage ring. In the case of larger axles the resulting cage is usually implemented as a soldered or welded design with aluminum or copper rods and rings. With smaller shaft heights it is particularly advantageous here to manufacture the squirrel-cage winding as a die-cast design. This is usually done in aluminum or copper die-casting.

At comparatively high speeds the ends of the cage rods projecting on both sides out of the laminated core of the rotor and the cage rings connected thereto are subject to very high centrifugal force stress. Additionally, as a result of high temperatures that cause a thermal expansion of, among other things, the cage ring, and of the high centrifugal forces mentioned, the material is subject to a great deal of stress at the junction between rod and cage ring, which ultimately can result in cracks or even fractures in the material.

The existing solutions are either particularly costly to implement, because they consist of a plurality of different parts, or they are not entirely suitable for the vulnerable junction between rotor rod and cage ring.

It would therefore be desirable and advantageous to obviate prior art shortcomings and to provide an improved squirrel-cage rotor of an asynchronous machine for comparatively high speeds which is easy to manufacture and which likewise allows even existing squirrel-cage rotors to be retrofitted.

SUMMARY OF THE INVENTION

According to one aspect of the present invention, a squirrel-cage rotor of an asynchronous machine, in particular a die-cast rotor, includes a shaft rotatable about an axis, a laminated core being rotation-locked on the shaft and having grooves arranged in the laminated core and opposing end faces, and a squirrel-cage winding having rotor rods disposed in the grooves and a cage ring disposed on each of the end faces in one-to-one correspondence and electrically connecting the rotor rods. The squirrel-cage rotor further includes a pair of retaining elements disposed on the shaft, wherein each end face of the laminated core has one of the retaining elements. Each retaining element extends in a radial direction in form of a disk or a spoke and has in an axial direction a wall and/or an axially extending finger. The wall overlaps on a radial periphery in the axial direction both the cage ring and a predefined axial section of the rotor rods that terminate in the cage ring, without increasing an external diameter of the laminated core.

According to another aspect of the present invention, an asynchronous machine includes the aforedescribed squirrel-cage rotor and is configured to have a rotation speed above 90 m/s.

According to yet another aspect of the invention, a method for manufacturing a squirrel-cage rotor of an asynchronous machine, in particular a die-cast rotor with grooves running in a laminated core, includes the steps of stacking or in-die stacking of a laminated core of the squirrel-cage rotor, positioning a squirrel-cage winding in the laminated core, connecting the laminated core of the squirrel-cage rotor to a shaft in a rotatably fixed manner, removing material at two end faces of the laminated core at a corresponding radial periphery of the laminated core, and connecting a retaining element to the shaft in a rotatably fixed manner such that at least one of a wall and a finger extends axially over the cage ring and the part of the laminated core and the radial periphery from which the material was removed.

Due to the inventive structure of the squirrel-cage rotor no additional parts are required to attain comparatively high speeds of the squirrel-cage rotor, because normally squirrel-cage rotors already have disks for balancing. According to the invention, the retaining element is advantageously designed such that it radially encompasses the cage ring as well as a defined axial subregion of the laminated core containing the rods.

The retaining element prevents any plastic deformation or a fracture of the squirrel-cage winding at the respective junction between rotor rod and cage ring when the squirrel-cage rotor experiences high centrifugal force stress during operation of the asynchronous machine. According to an advantageous feature of the present invention, the high sheer stress in the squirrel-cage rotor is directly suppressed at the point of connection between the rotor rods and the cage rings. The retaining element may be designed as a disk with a circumferential edge which holds the external part of the cage ring and a subregion of the rods. The disk, which may also be designed as in form of spokes to save weight, is positioned rotatably fixed on the shaft.

The retaining element thus has a disk-shaped basic structure which has a circumferential edge. This edge is designed to be cylindrical and/or conical. If the shell surface of the rotor is a different shape, e.g. polygonal, the embodiment of the retaining element, in other words of the disk and of the edge, is adapted to the geometric circumstances. If the edge is designed to be conical, it tapers axially toward the center of the rotor. Advantageously, the retaining element may be designed in one piece, i.e. the retaining element may be made from a single material and may advantageously be manufactured in a single work process.

According to another advantageous feature of the present invention, the squirrel-cage rotor the cage ring is prevented, at the vulnerable junction, from moving radially outward and possibly breaking off because of thermal expansion and/or stresses due to the centrifugal force. The retaining element may here be advantageously manufactured from a particularly high-tensile material, for example steel.

The axially required section for the axial overlap, extending from the cage ring into the laminated core, is for example implemented by turning in a lathe. To this end, the cage rings as well as the start and end regions of the laminated core together with the rods may be turned or milled in a predefined axial section, thereby producing at a shoulder the start and end of the laminated core, onto which the cylindrical wall of the edge and/or axially extending finger are positioned with an interference fit.

According to another advantageous feature of the present invention, existing squirrel-cage rotors may thus be retrofitted with the aforedescribed retaining elements.

Since with this design the external diameter of the squirrel-cage rotor is turned to adjust the size of the air gap between rotor and stator, the additional machining in the region of the cage rings does not add significant extra costs.

The air gap of the dynamoelectric machine, i.e. of the asynchronous machine, remains constant. The retaining elements on the end faces of the laminated core do not alter the external diameter of the squirrel-cage rotor or laminated core.

According to another advantageous feature of the present invention, the retaining element with its disk-shaped section is seated on the shaft in a rotatably fixed manner and can thus also be used for balancing in addition to performing the intended function of retaining the cage ring and rotor rod.

A negative balance can be attained on the aforedescribed disk by drilling out material, whereas a positive balance can be attained by applying balancing weights.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
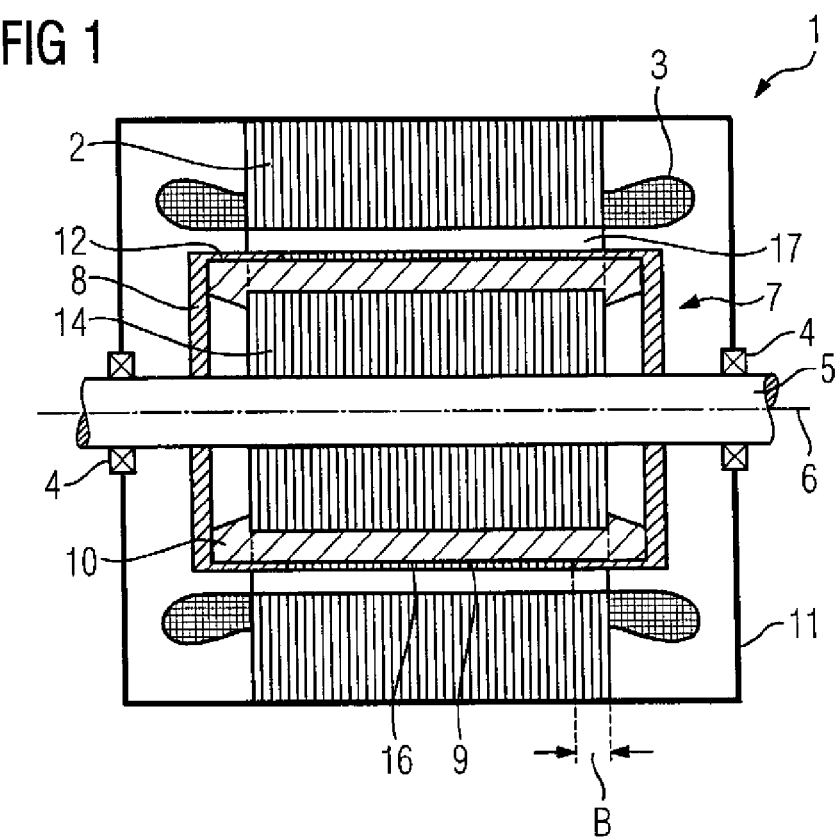
FIG. 1 shows schematically a longitudinal section of an asynchronous motor according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an asynchronous machine 1 in a housing 11 which has a stator 2 and a winding system (not shown in greater detail) which forms winding heads 3 on the end faces of the stator 2. Spaced apart from the stator 2 by an air gap 17 is the rotor 7. The rotor 7 is a squirrel-cage rotor which among other things has a laminated core 14 which is connected in a rotatably fixed manner to a shaft 5, the shaft 5 rotating about an axis 6. Disposed in grooves 16 of the rotor 7 are rotor rods 9 which on the end faces of the laminated core 14 are electrically connected to one another in the circumferential direction by a cage ring 10. In the present example the squirrel-cage winding thereby formed from rotor rods 9 and cage ring 10 is manufactured from copper and/or aluminum in a die-cast process. In asynchronous machines with a bigger shaft height individual rotor rods 9 made of copper are welded or soldered with their cage rings to the end faces.

The retaining element 8 can of course also be used with so-called hybrid rotors. In this case the grooves 16 of the laminated core 14 contain aluminum rods which are cast in the grooves 16 in a copper die-cast process and the aluminum rods project axially into the cage ring 10.

The cage ring 10 and some of the rotor rods 9 at the end and at the start of the laminated core 14 are inventively radially fixed by a retaining element 8, especially during operation of the electric machine. Thus the centrifugal force stresses occurring during operation of the asynchronous machine and/or the forces occurring during thermal expansion are absorbed. The retaining element 8 has a disk-like section which is connected to the shaft 5 in a rotatably fixed manner. One edge of the retaining element 8 extends radially outside the cage ring in an axial direction and—viewed in the circumferential direction—preferably forms a cylindrical wall 12 which extends not only radially over the cage ring, but also into the relief-turned sections at the start and end of the laminated core 14.

Because the cylindrical edge is situated in the relief-turned sections the air gap 17 of the asynchronous machine remains constant over the whole axial length of the rotor 7. The axial overlap B into the laminated core 14 of the squirrel-cage rotor is defined by the turning operation. The axial expansion of this axial overlap B ranges from one or two sheet thicknesses of the laminated core 14 to approximately one third of the axial length of the rotor 7, depending on the dynamic stress on the cage ring 10.

An axial overlap B of approximately one third of the depth of a groove has also proved particularly advantageous.

The radial material abrasion is geared to the centrifugal forces occurring which have to be coped with, as well as to the material and the dimensions of the retaining elements.

The housing 11 of the asynchronous machine is braced on the shaft 5 by means of bearings 4.

This asynchronous machine is for example cooled by through-ventilation or an internal cooling circuit, which is not however shown in greater detail.

Figure 2:
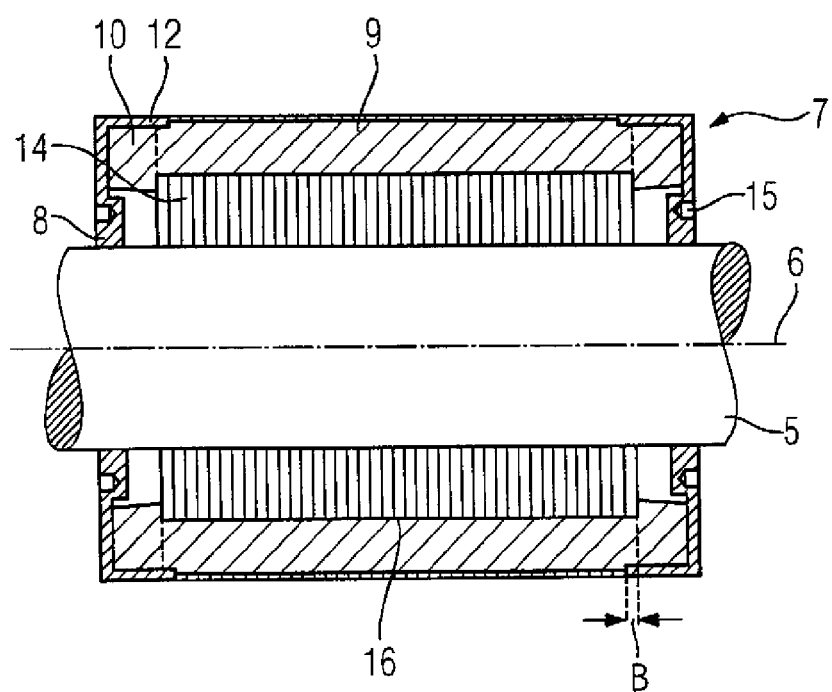
FIG. 2 shows schematically a longitudinal section of a squirrel-cage rotor according to the present invention.

FIG. 2 shows a squirrel-cage rotor, the retaining element 8 of which has additional facilities for balancing. Facilities for negative balancing or positive balancing are provided in particular in the region of the retaining element 8 radially underneath the cage ring 10. An imbalance of the entire rotor 7 can be compensated for in the material of the retaining element 8 by drilling out or by applying additional elements.

This illustration also clearly shows that an axial overlap B of the retaining element with the laminated core 14 occurs.

Figure 3:
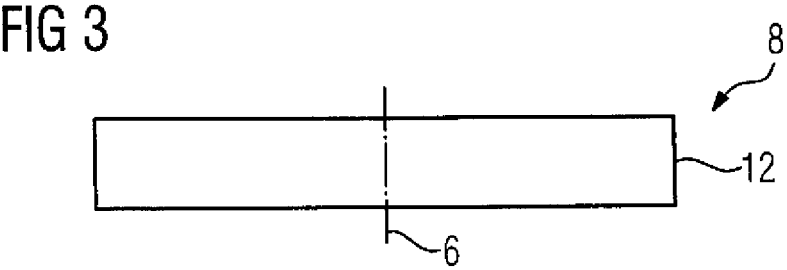
FIGS. 3 to 6 show various embodiments of a retaining element.

FIG. 3 shows a side view of the retaining element 8, the retaining element 8 having not only the disk-shaped embodiment but also a cylindrical wall 12 which overlaps both cage ring 10 and the end sections of the rotor rods 9 in the laminated core 14.

Figure 4:
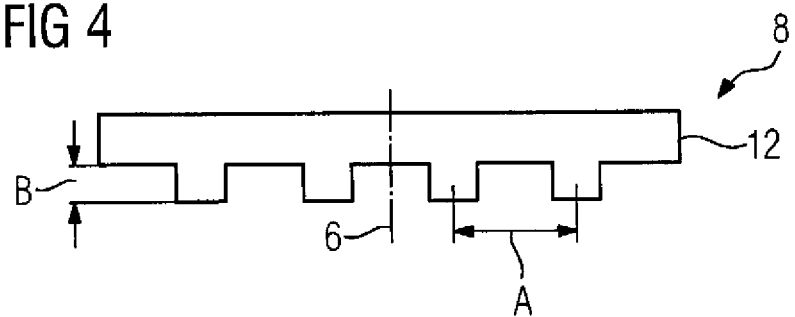

FIG. 4 shows in another embodiment of the retaining element 8 a section with a cylindrical wall, as well as a section for the axial overlap B of the rotor rods in the laminated core 14. It is assumed here that the rotor rods 9 in the grooves 16 only need to be covered where the effect of the forces mentioned above is amplified. The material for a complete cylindrical wall 12, such as in FIG. 3 for example, is saved in this case.

It is particularly necessary here for the spacing A between two fingers to correspond to the spacing of the grooves on the rotor 7. This is the only way to ensure that the fingers also axially overlap the turned sheet sections in which the rotor rods 9 are located.

Figure 5:
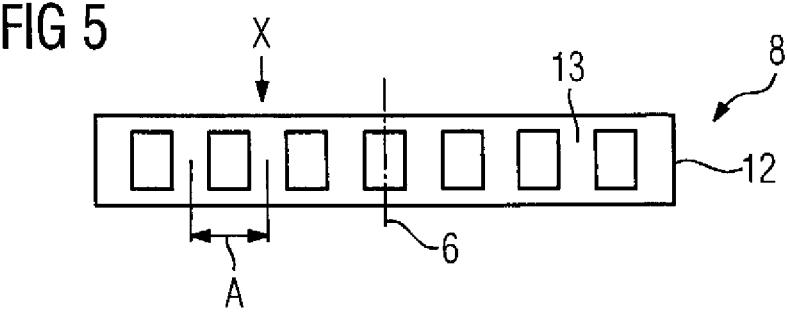

In another embodiment according to FIG. 5 the retaining element 8 is designed such that a cylindrical wall 12, viewed axially, is provided as solid material only in sections and is located only at the start and end of the retaining element 8. In the intermediate spaces, in particular in the regions where the rotor rods lie in the relief-turned grooves, fingers 13 are provided, which can be referred to as webs between the start and end of the retaining element 8.

Figure 6:
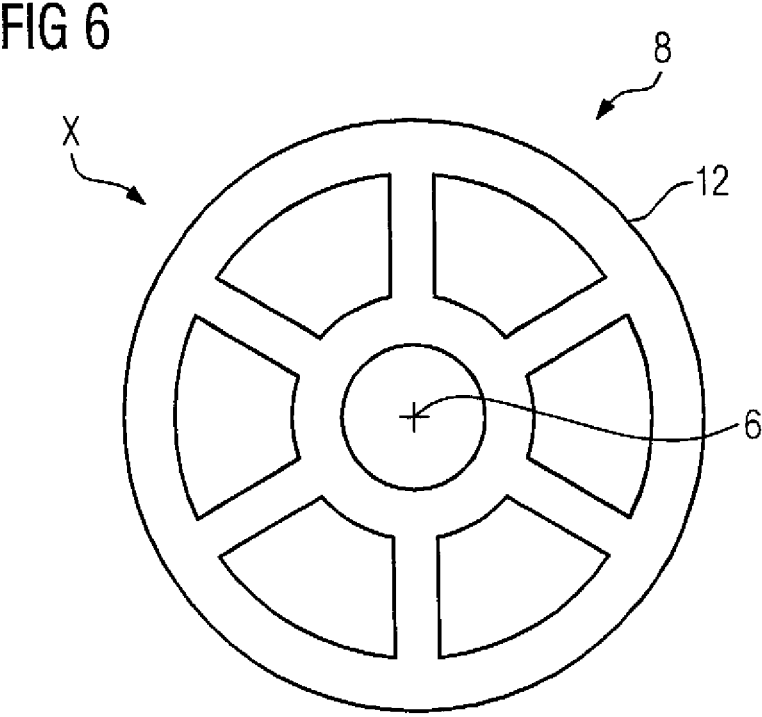

In a view according to FIG. 6 the retaining element 8 is viewed axially, the disk- or spoke-shaped structure emerging here. The spoke-shaped structure according to FIG. 6 is then particularly advantageous if material is to be saved within the balancing disk. Here too facilities for negative or positive balancing are possible, albeit not to the extent as provided for in the case of a disk made of solid material.

Figure 7:
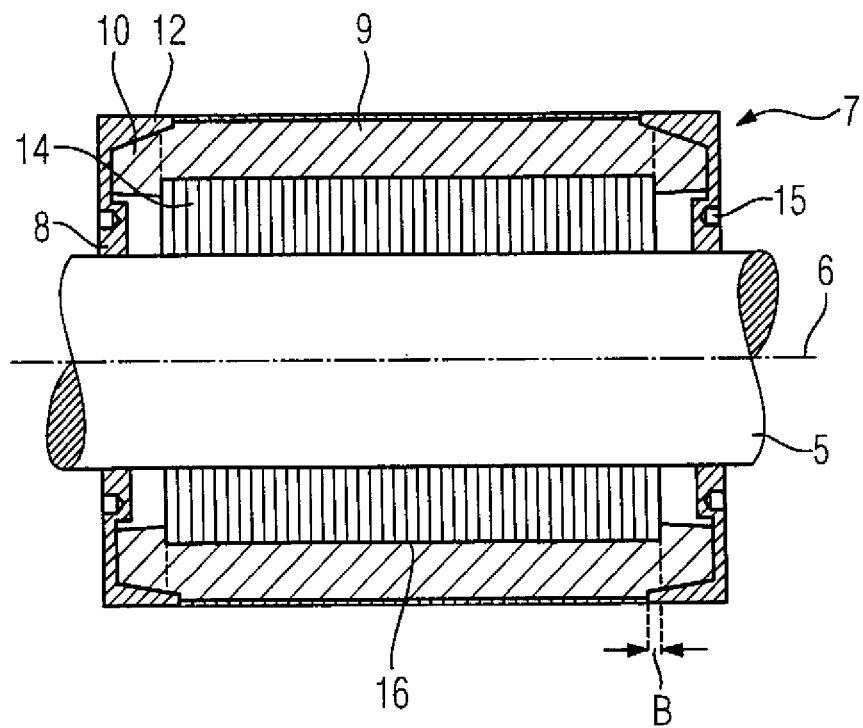
FIG. 7 shows a retaining element with a conical wall.

FIG. 7 shows an asynchronous machine 1 according to FIG. 1, in which the retaining element 8, in particular the edge, is conically shaped. Account is taken here of the fact that the centrifugal forces act more strongly on the end of the laminated core 14 and thus can be better compensated for.

Figure 8:
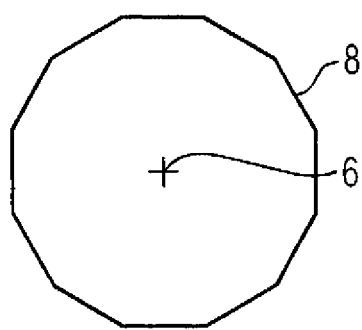
FIG. 8 shows a retaining element with a polygonal edge.

FIG. 8 shows a retaining element 8 for a polygonal rotor. The laminated core 14 of the rotor is not turned in the relevant section but is for example prepared for positioning of the retaining element 8 by a milling operation.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A squirrel-cage rotor of an asynchronous machine, comprising:
   a shaft rotatable about an axis;
   a laminated core being rotation-locked on the shaft and having grooves arranged in the laminated core and opposing end faces, wherein the laminated core has an outside diameter and axially extending end sections of the laminated core proximate to the end faces have an outside diameter that is smaller than the outside diameter of the laminated core;
   a squirrel-cage winding having rotor rods disposed in the grooves and a cage ring disposed on each of the end faces in one-to-one correspondence and electrically connecting the rotor rods; and
   a pair of retaining elements disposed on the shaft, wherein each end face of the laminated core has one of the retaining elements, each retaining element extending in a radial direction in form of a disk or a spoke and having at least one of an axially extending cylindrical wall and an axially extending finger extending from on an outer peripheral end section of the respective disk or spoke, wherein the axially extending cylindrical wall or the axially extending finger overlaps at each end section in the axial direction both the cage ring and a respective predefined axial section of the rotor rods that terminate in the cage ring, as well as the axially extending end sections of the laminated core, without increasing the outside diameter of the laminated core.

2. The squirrel-cage rotor of claim 1, wherein the squirrel-cage rotor is constructed from a die-cast rotor.

3. The squirrel-cage rotor of claim 1, wherein the retaining element is constructed from a high-strength material.

4. The squirrel-cage rotor of claim 3, wherein the retaining element is constructed from steel.

5. The squirrel-cage rotor of claim 1, wherein the retaining element is constructed to enable negative or positive balancing of the rotor.

6. The squirrel-cage rotor of claim 1, wherein the fingers have a predefined spacing in a circumferential direction, with the spacing corresponding, when viewed in the circumferential direction, to a spacing between the grooves on the squirrel-cage rotor.

7. An asynchronous machine, comprising a squirrel-cage rotor, said squirrel-cage rotor comprising:
   a shaft rotatable about an axis;
   a laminated core being rotation-locked on the shaft and having grooves arranged in the laminated core and opposing end faces;
   a squirrel-cage winding having rotor rods disposed in the grooves and a cage ring disposed on each of the end faces in one-to-one correspondence and electrically connecting the rotor rods; and
   a shaft rotatable about an axis;
   a laminated core being rotation-locked on the shaft and having grooves arranged in the laminated core and opposing end faces, wherein the laminated core has an outside diameter and axially extending end sections of the laminated core proximate to the end faces have an outside diameter that is smaller than the outside diameter of the laminated core;
   a squirrel-cage winding having rotor rods disposed in the grooves and a cage ring disposed on each of the end faces in one-to-one correspondence and electrically connecting the rotor rods; and
   a pair of retaining elements disposed on the shaft, wherein each end face of the laminated core has one of the retaining elements, each retaining element extending in a radial direction in form of a disk or a spoke and having at least one of an axially extending cylindrical wall and an axially extending finger extending from on an outer peripheral end section of the disk or spoke, wherein the axially extending cylindrical wall or the axially extending finger overlaps at each end section in the axial direction both the cage ring and a respective predefined axial section of the rotor rods that terminate in the cage ring, as well as the axially extending end sections of the laminated core, without increasing the outside diameter of the laminated core.

8. The asynchronous machine of claim 7, wherein the squirrel-cage rotor has a rotation speed above 90 m/s.

9. A method for manufacturing a squirrel-cage rotor of an asynchronous machine, comprising:
   stacking or in-die stacking of a laminated core of the squirrel-cage rotor;
   positioning a squirrel-cage winding in the laminated core;
   connecting the laminated core of the squirrel-cage rotor to a shaft in a rotatably fixed manner;
   removing material at two end faces of the laminated core at a corresponding radial periphery of the laminated core wherein the laminated core has an outside diameter and axially extending end sections of the laminated core proximate to the end faces have an outside diameter that is smaller than the outside diameter of the laminated core; and connecting a retaining element to the shaft in a rotatably fixed manner such that at least one of a wall and a finger extends axially over the cage ring and the part of the laminated core and the radial periphery from which the material was removed, without increasing an outside diameter of the laminated core.

10. The method of claim 9, wherein the material is removed by turning or milling.

11. The method of claim 9, wherein the squirrel-cage rotor is a die-cast rotor having grooves extending in the laminated core.

12. The method of claim 9, wherein the rotor is negatively or positively balanced by a retaining element disposed on each end face of the laminated core.

* * * * *